United States Patent [19]

Blount

[11] 4,170,697

[45] Oct. 9, 1979

[54] PROCESS FOR THE PRODUCTION OF POLYISOCYANATE SILICATE SOLID OR CELLULAR SOLID PRODUCTS

[76] Inventor: David H. Blount, 5450 Lea St., San Diego, Calif. 92105

[21] Appl. No.: 918,671

[22] Filed: Jun. 23, 1978

Related U.S. Application Data

[63] Continuation-in-part of Ser. No. 845,464, Oct. 25, 1977, Pat. No. 4,120,937.

[51] Int. Cl.² .............................................. C08J 9/00
[52] U.S. Cl. ................................. 521/82; 521/128; 260/9; 521/130; 521/131; 260/18 R; 521/133; 528/44; 260/28 R; 528/74; 528/78; 260/28 P; 528/79; 528/80; 260/29.2 M; 528/83; 528/129; 260/29.2 TN; 525/452; 528/140; 260/33.6 UB; 528/144; 528/147; 528/145; 528/146; 528/259; 528/274; 423/325; 528/276; 528/283; 528/332; 528/364; 521/87; 521/89; 521/90; 521/91; 521/92; 521/93; 521/94; 521/95; 521/96; 521/97; 521/98; 521/99; 521/100; 521/113; 521/114; 521/120; 521/121; 521/122; 521/123; 521/125; 521/127
[58] Field of Search ......... 260/9, 858, 859 R, 33.6 UB, 260/28 R, 28 P, 18 R, 29.2 M, 29.2 TN; 521/82, 83, 87, 89, 90–100, 113, 114, 120–123, 125, 127, 128, 130, 131, 133; 528/74, 79, 80, 44, 83, 129, 132, 140, 144, 147, 145, 146, 259, 274, 276, 283, 332, 364; 423/325

[56] References Cited

U.S. PATENT DOCUMENTS 4,120,937  10/1978  Blount .............................. 423/325

OTHER PUBLICATIONS

The Merk Index, p. 1888, 9th Ed., 1976.

*Primary Examiner*—Melvyn I. Marquis

[57] ABSTRACT

Silicon halides will react chemically with polyols to produce polyol silicate resinous products which will react chemically with polyisocyanates to produce polyisocyanate silicate solid or cellular solid products.

20 Claims, No Drawings

PROCESS FOR THE PRODUCTION OF POLYISOCYANATE SILICATE SOLID OR CELLULAR SOLID PRODUCTS

CROSS-REFERENCE TO RELATED APPLICATIONS

This application is a continuation-in-part of my copending U.S. Patent application Ser. No. 845,464, filed Oct. 25, 1977 now U.S. Pat. No. 4,120,937.

BACKGROUND OF THE INVENTION

This invention relates to a process for the production of polyisocyanate silicate solid or cellular solid products by reacting a polyol silicate resinous product with a polyisocyanate to produce a polyisocyanate silicate prepolymer, then by reacting the prepolymer with a curing agent to produce a polyisocyanate silicate solid or cellular solid product. The polyol silicate resinous product is produced by reacting a silicon halide with a polyol to produce the polyol silicate resinous product.

The silicon halide may be first reacted with a fine granular silicon acid, such as hydrated silica, to produce halosilicon acids which are then reacted chemically with polyols to produce polyol silicon acid resinous product. The hydrated silica used in this process may be produced by any of the commonly known methods in the arts. Natural silicates which contain free silicic acid groups may also be used. Hydrated silica containing Si-H groups (silicoformic acid) may also be used in this invention. It is preferred that the hydrated silica be in a fine granular form.

The silicon halides which may be employed are those which have the structural formula:

$$R_y SiX_z$$

wherein X is any halogen or mixture thereof, with the preferred being chlorine; wherein R is independently selected from the group consisting of a monovalent hydrocarbon radical, a monovalent alkoxy radical, and a monovalent aryloxy radical; wherein y is an integer from 0-2, inclusive; wherein z is an integer and the sum of y plus z is equal to 4. Each of the R radicals should, preferably, although not essentially, contain less than seven carbon atoms since the compounds containing these radicals are more readily available and have been found to be the most useful. The R radicals may be the same or different. Illustrative hydrocarbon, alkoxy and aryloxy are as follows: alkyl radicals, such as methyl, ethyl, propyl, isopropyl, butyl, hexyl, octyl, decyl, dodecyl, etc.; alkenyl radicals, such as ethenyl, propenyl, etc.; alkynyl radicals such as ethynyl, propynyl, etc.; cycloalkyl radicals, such as cyclopropyl, cyclobutyl, cycloamyl, cyclohexyl, etc.; cycloalkenyl radicals, such as cyclobutenyl, cyclopentenyl, cyclohexenyl, etc.; aryl radicals, such as phenyl, anthracyl, naphthyl, etc.; aralkyl radicals, such as benzyl, phenyl-ethyl, phenyl-propyl, etc.; alkaryl radicals, such as xylyl, tolyl, ethylphenyl, p-butylphenyl, p-diisobutyl phenyl, etc.; alkoxy radicals, such as methoxy, ethoxy, propoxy, etc.; and aryloxy radicals such as phenoxy, p-butylphenoxy, etc. In addition, the hydrocarbon, alkoxy or aryloxy group may be substituted with non-interfering substituents, such as halo (i.e., chloro, bromo, fluoro or iodo), nitro, sulfo, etc. The X substituent in the silicon halide is any halogen or mixture thereof, with the preference being chloride. Silicon trihalides may be used in certain cases.

Exemplificative silicon halides include, but are not limited to, the following compounds: silicon tetrachloride; silicon tetrabromide; silicon tetrafluoride; silicon tetraiodide; methyltrichlorosilane; dimethyldichlorosilane; diethyldichlorosilane; di-n-butyl-dichlorosilane; diphenyldichlorosilane; phenyltrichlorosilane; ethyl phenyldichlorosilane; methyl ethyldichlorosilane; methyl propyldichlorosilane; etc.

Silicon tetrachloride is the preferred silicon halide. The silicon tetrachloride may be utilized with any of the listed silicon halides or mixtures of the listed silicon halides.

For the purpose of this invention, the products produced by the chemical reaction of hydrated silica with a silicon tetrahalide will be called halosilicon acid; the products produced by the chemical reaction of hydrated silica with an organic halosilane will be called an organic halosilicon acid. The product produced by reaction of the halosilicon acid with a polyol will be called a polyol silicon acid. The product produced by the reaction of the polyol silicon acid with a polyisocyanate will be known as polyisocyanate silicate solid or cellular solid product. The product produced by the reaction of a silicon halide with a polyol will be known as a polyol silicate resinous product. The product produced by the reaction of a polyol silicate resinous product with a polyisocyanate will be known as a polyisocyanate silicate solid or cellular solid product.

Any suitable polyol may be used in this invention. It is preferred to use polyols, in particular, polyol compounds and/or polyol polymers which contain 2 to 8 hydroxyl groups, e.g. polyhydroxyl compounds and polyesters, polyethers, polythioesters, polyacetals, polycarbonates or polyester amides containing at least 2, generally from 2 to 8, but preferably from 2 to 4 hydroxyl groups. Polyhydroxyl compounds (polyols) which already contain urethane or urea groups, modified or unmodified natural, e.g. castor oil, carbohydrates and starches, may also be used. Additional products of alkylene oxides with phenolformaldehyde resins or urea-formaldehyde resins are also suitable for the purpose of the invention. Polybutadiene polymers with free hydroxyl groups, polysulfide polymers, polybutadiene-styrene copolymers and butadiene-acrylonitrile copolymer chains are also suitable for the purpose of the invention.

The hydroxyl group-containing polyesters (polyols) may be, for example, reaction products of polyhydric alcohol, preferably dihydric alcohols and polybasic, preferably dibasic carboxylic acids. The corresponding polycarboxylic acid anhydride or corresponding polycarboxylic acid esters of lower alcohols or their mixture may be used instead of the free polycarboxylic acids for preparing the polyesters. The polycarboxylic acid may be aliphatic, cycloaliphatic, aromatic, and/or heterocyclic and may be substituted, e.g. with halogen atoms and may be unsaturated. Examples include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, glutaric acid anhydride, maleic acid, maleic acid anhydride, fumaric acid, dimeric and trimeric fatty acids such as oleic acid, optionally mixed with monomeric fatty acids, dimethylterephthalate and bis-glycol terephthalate.

Suitable polyhydric alcohols may be used such as, for example, ethylene glycol, propylene-1,2- and -1,3-glycol, butylene -1,4- and -2,3-glycol, hexane-1,6-diol, octane-1,8-diol, neopentyl glycol, cyclohexanedimethol-(1,4-bis-hydroxy-methylcyclohexane), 2-methylpropane-1,3-diol, glycerol, trimethylol propane, hexane-1,2,6-triol, butane-1,2,4-triol, trimethylol ethane, pentaerythritol, quinitol, mannitol, sorbitol, glucose, starches, fructose, cane sugar, dextrines, castor oils, methylglyoside, diethylene glycol, triethylene glycol, tetraethyleneglycol, polyethylene glycols, dipropene glycol, polypropylene glycols, dibutylene glycol and polybutylene glycols. The polyesters may also contain a proportion of carboxyl end groups. Polyesters of lactones, such as ε-caprolactone, or hydroxycarboxylic acid, such as ω-hydroxy-caproic acid, may also be used.

The polyethers with at least 2, generally from 2 to 8 and preferably 2 or 3 hydroxy groups, used according to the invention, are known and may be prepared, e.g. by the polymerization of epoxides, e.g. ethylene oxide, propylene oxide, butylene oxide, tetrahydrofuran, styrene oxide, or epichlorohydrin, each with itself, e.g. in the presence of $BF_3$, or by addition of these epoxides, optionally as mixtures or successively, to starting components which contain reactive hydrogen atoms such as alcohols or amines, e.g. water, ethylene glycol, propylene-1,3'- or -1,2-glycol, trimethylol propane, 4,4'-dihydroxydiphenylpropane, aniline, ammonia, ethanolamine or ethylenediamine. Sucrose polyethers such as those described, e.g. in German Pat. Nos. 1,176,358 and 1,064,938 may also be used according to this invention. It is frequently preferred to use polyethers which contain primary OH groups, (up to 90% by weight, based on the total OH group content of the polyester). Polyethers modified with vinyl polymers such as those which may be obtained by polymerizating styrene or acrylonitrile in the presence of polyethers (U.S. Pat. Nos. 3,383,351; 3,304,273; 3,525,093 and 3,110,695 and German Pat. No. 1,152,536) and polybutadienes which contain OH groups are also suitable.

By "polythioethers" are meant, in particular, the condensation products of thiodiglycol with itself and/or with other glycols, dicarboxylic acids, formaldehyde, aminocarboxylic acids or amino alcohols. The products obtained are polythio-mixed ethers, polythioether esters or polythioether ester amides, depending on the cocomponent.

The polyacetals used may be, for example, the compounds which may be obtained from glycols, e.g. diethylene glycol, triethylene glycol, (4,4'-dihydroxydiphenyldimethylmethane) hexanediol and formaldehyde. Polyacetals suitable for the invention may also be prepared by the polymerization of cyclic acetals.

The polycarbonates with hydroxyl groups used may be of the known kind, e.g. those which may be prepared by reacting diols, e.g. propane-1,3-diol, butane-1,4-diol and/or hexane-1,6-diol or diethylene glycol, triethylene glycol or tetraethylene glycol, with diarylcarbonates, e.g. diphenylcarbonate or phosgene.

The polyester amides and polyamides include, e.g. the predominantly linear condensates obtained from polyvalent saturated or unsaturated carboxylic acids or their anhydrides and polyvalent saturated and unsaturated amino alcohols, diamines, polyamines and mixtures thereof.

Examples of these compounds which are to be used according to the invention have been described, e.g. in "High Polymers", Vol. XVI, "Polyurethanes, Chemistry and Technology", published by Saunders-Frisch, Interscience Publishers, New York, London, Vol. I, 1962, pages 32 to 42 and pages 44 to 54 and Vol. II, 1964, pages 5 to 6 and 198 to 199, and in Kunststoff-Handbuch, Vol. VII, Vieweg-Hochtlen, Carl-Hanser-Verlag, Munich, 1966, e.g. on pages 45 to 71.

Any suitable polyisocyanate or polyisothiocyanate may be used in this invention. For example, arylene polyisocyanates, such as tolylene, metaphenylene, 4-chlorophenylene-1,3-, methylene-bis (phenylene-4-), biphenylene-4,4'-, 3,3'-dimethoxybiphenylene -4,4'-, 3,3'-diphenylbiphenylene-4,4'-, naphthalene-1,5-, and tetrahydro-naphthalene-1,5-diisocyanates and triphenylmethane triisocyanate, alkylene polyisocyanates such as ethylene, ethylidine, propylene-1,2-, butylene-1,4-, butylene-1,3-, hexylene-1,6-, decamethylene-1,10-, cyclohexylene-1,2-, cyclohexylene-1,4-, and methylene-bis (cyclohexyl-4,4'-) diisocyanates.

Any suitable polyisocyanate or polyisothiocyanate may be used in this invention. For example, arylene polyisocyanates, such as tolylene, metaphenylene, 4-chlorophenylene-1,3-, methylene-bis (phenylene-4-), biphenylene-4,4'-, 3,3'-dimethoxybiphenylene -4,4'-, 3,3'-diphenylbiphenylene-4,4'-, naphthalene-1,5-, and tetrahydro-naphthalene-1,5-diisocyanates and triphenylmethane triisocyanate, alkylene polyisocyanates such as ethylene, ethylidine, propylene-1,2-, butylene-1,4-, butylene-1,3-, hexylene-1,6-, decamethylene-1,10-, cyclohexylene-1,2-, cyclohexylene-1,4-, and methylene-bis (cyclohexyl-4,4'-) diisocyanates. Phosgenation products of aniline-formaldehyde condensation may be used such as polyphenyl-polymethylene polyisocyanates. Polyisothiocyanates, inorganic polyisothiocyanates, polyisocyanates which contain carbodiimide groups as described in German Pat. No. 1,092,007 and polyisocyanates which contain urethane groups, allophanate groups, isocyanurate groups, urea groups, imide groups or biuret groups may be used to produce polyisocyanate prepolymers or polyisocyanate organic silicate solid or cellular solid products. Mixtures of the above mentioned polyisocyanates may be used.

It is generally preferred to use commercial, readily available polyisocyanates such as toluene-2,4- and -2,6-diisocyanate and any mixture of these isomers, ("TDI"), ("crude MDI"), polyphenyl-polymethylene-isocyanates obtained by aniline-formaldehyde condensation followed by phosgenation, and modified polyisocyanates which contain carbondiimide groups, urethane groups, allophanate groups, isocyanurate groups, urea groups, imide groups or biuret groups, ("modified polyisocyanates").

Other polyisocyanates may be used in this invention such as polyisocyanates which contain ester groups such as listed in British Pat. Nos. 956,474 and 1,086,404 and in U.S. Pat. Nos. 3,281,378 and 3,567,763, polyisocyanate reaction products with acetals according to German Pat. No. 1,072,385, polyisocyanates prepared by telomerization reactions as described in Belgian Pat. No. 723,640, polyphenyl-polymethylene polyisocyanates as described in British Patent specification Nos. 874,430 and 848,671, polyisocyanates which contain carbodiimide groups as described in German Pat. No. 1,092,007, perchlorinated arylpolyisocyanates such as those described, e.g. in German Pat. No. 1,157,601, polyisocyanates which contain allophanate groups as described, e.g. in British Pat. No. 994,890 and in Belgian Pat. No. 761,628, and the diisocyanates described in U.S. Pat. No. 3,492,330, polyisocyanates which contain biuret groups as described, e.g. in German Pat. No. 1,101,394, in British Pat. No. 889,050 and in French Pat. No. 7,017,514, polyisocyanates which contain isocyanurate groups as described, e.g. in German Pat. Nos. 1,022,789 and 1,027,394 and in British Pat. Nos. 1,091,944, 1,267,011 and 1,305,036, polyisocyanates which contain acylated urea groups according to U.S. Pat. No. 3,517,139 and polyisocyanates which contain urethane groups as described in Belgian Pat. No. 752,261 or in U.S. Pat. No. 3,394,164. Mixtures of the above polyisocyanates may be used. Organic polyisocyanates which are modified with ionic groups, for example, with carboxyl and/or carboxylate groups and/or sulphonate groups may be used with the polyisocyanates in this invention. Polyisocyanates may be reacted with alkali metal silicates such as sodium metasilicate pentahydrate, potassium metasilicate pentahydrate, dry granular crude sodium silicate and dry granular lithium silicate to produce alkali metal polyisocyanate silicate prepolymers with terminal isocyanate, used in this invention. Any of the suitable non-ionic hydrophilically modified organic polyisocyanates may be used in this invention.

Suitable polyisocyanates such as the aromatic diisocyanates may be reacted with organic compounds which contain at least two hydrogen atoms capable of reacting with isocyanates, preferably with a molecular weight of generally from 300 to about 10,000 and in the ratio of 50 to 99 mols of aromatic diisocyanate with 1 to 50 mols of said organic compounds to produce isocyanate-terminated reaction products. It is preferred to use polyols, in particular compounds and/or polymers wich contain 2 to 8 hydroxyl groups, especially those with a molecular weight of from about 800 to about 10,000 and preferably from 1,000 to about 6,000, e.g. polyesters, polyethers, polythioethers, polyacetals, polycarbonates, or polyester amides containing at least 2, generally from 2 to 8, but preferably from 2 to 4 hydroxyl groups, of the kind known for producing homogenous and cellular polyurethanes. The polyols were previously listed in this Specification.

Any suitable curing agent and/or activator may be used in this invention. The following are examples of curing agents, but are not limited to these:
1. Water.
2. Water containing 10% to 70% by weight of an alkali metal silicate, such as sodium and/or potassium silicate. Crude commercial alkali metal silicate may contain other substances, e.g. calcium silicate, magnesium silicate, borates or aluminates and may also be used.
3. Water containing 20 to 50% of ammonium silicate.
4. Water containing 5 to 40% by weight of magnesium oxide in the form of a colloidal dispersion.
5. Alkali metal metasilicate pentahydrate such as sodium silicate, potassium silicate, and commercial dry granular sodium and potassium silicate.
6. Water containing 20 to 70% by weight of silica gel.
7. Water containing 0.001 to 10% by weight of an activator (catalyst) such as:
    A. Tertiary amines, e.g. triethylamine, tributylamine, N-methyl-morpholine, N-ethyl-morpholine, N-coco-morpholine, N,N,N'N'-tetramethylene-diamine, 1,4-diazo-bicyclo(2,2,2)-octane, N-methyl-N'-dimethylaminoethyl piperazine, N,N-dimethylbenzylamine, bis(N,N-diethylaminoethyl-adipate), N,N-diethylbenzylamine, pentamethyldiethylenetriamine, N,N-dimethylcyclohexylamine, N,N,N',N'-tetramethyl-1,3-bis-tanediamine, N,N-dimethyl-beta-phenylethylamine, and 1,2-dimethylimidazole. Suitable tertiary amine activators which contain hydrogen atoms which are reactive with isocyanate groups include, e.g. triethanolamine, triisopanolamine, N,N-dimethylethanolamine, N-methyldiethanolamine, N-ethyl-diethanolamine and their reaction products with alkylene oxides, e.g. propylene oxide and/or ethylene oxide.
    B. Organo-metallic compounds, preferably organotin compounds such as tin salts of carboxylic acid, e.g. tin acetate, tin octoate, tin ethyl hexoate and tin laurate and the dialkyl tin salts of carboxylic acids, e.g. dibutyl tin diacetate, dibutyl tin dilaurate, dibutyl tin maleate or dioctyl tin diacetate.
    C. Silaamines with carbon-silicon bonds, as described in British Pat. No. 1,090,589, may also be used as activators, e.g. 2,2,4-trimethyl-2-silamorpholine or 1,3-diethylaminomethyl-tetramethyl-disiloxane.
    D. Other examples of catalysts which may be used according to the invention and details of their action are described in Kunststoff-Handbuch, Volume VII, published by Viewig and Hochtlen, Carl-Hanser-Verlag, Munich, 1966, e.g. on page 96 and 102.
8. Water containing 20 to 70% by weight of a water-binding agent, being capable of absorbing water to form a solid or a gel, such as hydraulic cement, synthetic anhydrite, gypsum or burnt lime.
9. Water containing 1 to 10% by weight of bases which contain nitrogen such as tetraalkyl ammonium hydroxides.
10. Water containing 1 to 10% by weight of alkali metal hydroxides such as sodium hydroxide, alkali metal phenolates such as sodium phenolate or alkali metal alcoholates such as sodium methylate.
11. Water containing 1 to 10% by weight of sodium polysulfide.

Surface active additives, (emulsifiers and foam stabilizers) may also be used according to the invention. Suitable emulsifiers are, e.g. the salts of fatty acids with amines, e.g. oleic acid diethylamine or stearic acid diethanolamine. Other surface active additives are alkali metal or ammonium salts of sulphonic acid, e.g. dodecylbenzene sulphonic acid or dinaphthyl methane disulphonic acid, or of fatty acids, e.g. ricinoleic acid, or of polymeric fatty acids.

The foam stabilizers used are mainly water-soluble polyester siloxanes. These compounds generally have a polydimethylsiloxane group attached to a copolymer of ethylene oxide and propylene oxide. Foam stabilizers of this kind have been described, e.g. in U.S. Pat. No. 3,629,308. These additives are preferably used in quantities of from 0% to 20% by weight, based on the reaction mixture.

Negative catalysts, for example, substances which are acidic in reaction, e.g. hydrochloric acid or organic acid halides, known cell regulators, e.g. paraffins, fatty alcohols or dimethyl polysiloxanes, pigments or dyes, known flame retarding agents, e.g. tris-chloroethylphosphate or ammonium phosphate and polyphosphates, stabilizers against aging and weathering, plasticizers, fungicidal and bacteriocidal substances and fillers, e.g. barium sulphate, kieselguhr, carbon black or whiting, may also be used according to the invention.

Further examples of surface active additives, foam stabilizers, cell regulators, negative catalysts, stabilizers, flame retarding substances, plasticizers, dyes, fillers and fungicidal and bacteriocidal substances and details about methods of using these additives and their action may be found in Kunststoff-Handbuch, Volume VI, published by Vieweg and Hochtlen, Carl-Hanser-Verlag, Munich 1966, e.g. on pages 103 to 113. The halogenated paraffins and inorganic salts of phosphoric acid are the preferred fire retardant agents.

SUMMARY OF THE INVENTION

I have discovered that polyol silicate resinous products and polyol silicon acid resinous products will react chemically with a polyisocyanate compound or prepolymer to produce a polyisocyanate silicate prepolymer and that the prepolymer will react with a curing agent to produce a polyisocyanate silicate solid or cellular solid product.

The preferred method to produce polyisocyanate silicate solid or cellular solid is to react 1 mol of a silicon halide with 1 to 4 mols of a polyol by slowly mixing while agitating to produce a polyol silicate resinous product. The polyol silicate resinous product should contain 2 or more free hydroxyl groups per mol. The polyol silicate resinous product is then mixed with a polyisocyanate in the amount so that an excess of polyisocyanate is used to produce isocyanate-terminated polyisocyanate silicate prepolymer; the mixture is agitated for 10 to 60 minutes at ambient temperature and pressure, thereby producing an isocyanate-terminated polyisocyanate silicate prepolymer. The prepolymer may be cured by heating at a temperature of 60° to 160° C. for 20 to 120 minutes or by mixing with a curing agent in the amount of 3% to 200% by weight, based on the prepolymer, at a temperature of 20° to 60° C. and ambient pressure; the reaction is completed in a few seconds to about 12 hours, thereby producing polyisocyanate silicate solid or cellular solid product. The preferred method may be altered to where the silicon halide, polyol and polyisocyanate are mixed simultaneously while agitating at ambient temperature and pressure for 10 to 60 minutes, thereby producing an isocyanate-terminated polyisocyanate silicate prepolymer.

An alternate method to produce polyisocyanate silicate solid or cellular solid products is to react 1 part by weight of a dry, fine, granular hydrated silica with about 1 to 2 parts by weight of a silicon halide, preferably silicon tetrachloride, to produce a white granular solid, halosilicon acid. The halosilicon acid is then mixed with a polyol in the ratio of 4 to 8 OH groups in the polyol to 1 to 3 halogen groups in the halosilicon acid. There should be at least 2 free OH groups per molecule; it is preferred that the polyol silicon acid resinous product contains 2 to 8 hydroxyl groups per molecule. The polyisocyanate will also react chemically with the free silicic acid groups present in the polyol silicon acid resinous product. The methods to produce halosilicon acids and polyol silicon acid resinous product may be found in U.S. Pat. Application No. 845,464, filed Oct. 25, 1977, by David H. Blount now U.S. Pat. No. 4,120,937. The polyol silicon acid resinous product is mixed with a polyisocyanate in the ratio of 1 to 50 mols of the polyol silicon acid resinous product to 50 to 99 mols of the polyisocyanate or in the amount of 0.5 to 2 parts by weight of the polyol to 1 to 10 parts by weight of the polyisocyanate and then is agitated for 10 to 60 minutes, thereby producing an isocyanate-terminated polyisocyanate silicate prepolymer. A curing agent in the amount of 3% to 200% by weight, based on the weight of the polyisocyanate silicate prepolymer, is added to the isocyanate-terminated polyisocyanate silicate prepolymer while agitating until the mixture begins to expand or solidify, thereby producing polyisocyanate silicate solid or cellular solid product.

In alternate methods, a polyol may be reacted with the polyisocyanate to produce an isocyanate-terminated polyurethane prepolymer, then reacted with the polyol silicon acid resinous product and/or polyol silicate resinous product, or the polyol may be added with the polyol silicon acid resinous product, then reacted with the polyisocyanate to produce an isocyanate-terminated polyisocyanate silicate prepolymer.

In another alternate method, the polyol silicate resinous product and/or polyol silicon acid resinous product, the polyisocyanate and the curing agent are mixed simultaneously to produce a polyisocyanate silicate solid or cellular solid product.

In still another alternate method, the silicon halide, silicon acid, polyol and the polyisocyanate may be added simultaneously to produce an isocyanate-terminated polyisocyanate silicate prepolymer. The prepolymer is then cured by the addition of a curing agent and/or heat to produce a polyisocyanate silicate solid or celluloar solid resinous product.

The reactions of this invention may take place at any suitable temperature or pressure. Although most reactions will take place at ambient temperature and pressure, in certain reactions, a lower or elevated temperature and elevated pressure may be necessary.

Mixtures which contain more than 30% by weight of water are usually soft solid products which may be used as putties, surface coatings, adhesive bonds, grouting compositions, and may be used for producing foams by adding a blowing agent. The blowing agents are usually inert liquids with boiling points ranging from −25° to 80° C.

The organic blowing agents used may be, e.g. acetone, ethyl acetate, methanol, ethanol, halogenated alkanes, e.g. methylene chloride, chloroform ethylidene chloride, vinylidene chloride, monofluorotrichloromethane, dichlorodifluoromethane, butane, hexane, heptane or diethylether. Compounds which decompose at temperatures above room temperature with liberation of gases, e.g. nitrogen, such as azo compounds, azoisobutyric acid nitrile, may also act as blowing agents. Other examples of blowing agents and details about the use of blowing agents are described in Kunststoff-Handbuch, Volume VII, published by Vieweg and Hochtlen, Carl-Hanser-Verlag, Munich 1966, e.g. on pages 108 and 109, 453 to 455 and 507 to 510. Compressed air may be used as the blowing agent.

The proportions of the components may be adjusted to obtain the desired product from a solid to a highly cellular solid. When water is used, it reacts with the NCO group to produce $CO_2$ and pores are produced in the product by the evolved $CO_2$. In certain cases the $CO_2$ is rapidly evolved and escapes before the product hardens, and a solid product can be produced nearly completely free of air cells. The hardening times generally increases with additives. When a high silicate content, from 80% to 99% by weight, is desirable, such as when the final product is required to have mainly the properties of an inorganic silicate plastic, in particular high temperature resistance and complete flame resistance, an alkali metal silicate is added to the curing agent. The function of the polyisocyanate in this case is that of a non-volatile hardener whose reaction product is a high molecular weight polymer which reduces the brittleness of the product.

When an alkali silicate or an alkali curing agent is used in the invention, fine metal powder, e.g. powdered calcium, magnesium, aluminum or zinc, may also act as blowing agents by bringing about the evolution of hydrogen. These metal powders also have a hardening and reinforcing effect.

Various resin extenders in the amount of 0% to 50% by weight, based on the weight of the polyisocyanate silicate prepolymer, may be added to the polyisocyanate silicate prepolymer, such as mineral oil, coal tar, poly-alpha-methylstyrene, and mixtures thereof.

Various plasterizers in the amount of 0% to 50%, based on the weight of the polyisocyanate silicate prepolymer, may be added to the polyisocyanate silicate prepolymer such as benzoate ester or phthalate ester or polyester benzoate, e.g. dipropylene glycol benzoate, dodecyl phthalate or propylene glycol phthalate.

The properties of the foams (cellular solid) obtained from any given formulation, e.g. their density in the moist state, depends to some extent on the details of the mixing process, e.g. the form and speed of the stirrer and the form of the mixing chamber, and also the selected temperature at which foaming is started. The foams will usually expand 3 to 12 times their original volume.

The products produced by the invention have many uses. The reaction mixtures, with or without a blowing agent, may be mixed in a mixing apparatus; then the reaction mixture (polyisocyanate silicate prepolymer plus a curing agent) may be sprayed by means of compressed air or by the airless spraying process onto surfaces; subsequently, the mixture expands and hardens in the form of a cellular solid which is useful for insulation, filling, and moisture-proofing coating. The foaming material may also be forced, poured or injected molded into cold or heated molds which may be relief molds or solid or hollow molds, optionally by centrifugal casting and left to harden at room temperature or temperature up to 200° C., optionally under pressure. In certain cases it may be necessary to heat the mixing or spraying apparatus to initiate foaming; then, once foaming has started, the heat evolves by the reaction between components which continues the foaming until the reaction is complete. A temperature between 40° to 150° C. may be required to initiate foaming. Reinforcing elements may quite easily be incorporated into the reaction mixtures.

The inorganic and/or organic reinforcing elements may be, e.g. fibers, metal wires, foams, fabrics, fleeces or skeletons. The reinforcing elements may be mixed with the reaction mixture, for example, by the fibrous web impregnation or by processes in which the reaction mixtures and reinforcing fibers are together applied to the molds, for example, by means of a spray apparatus. The shaped products obtained in this way may be used as building elements, e.g. in the form of sandwich elements, e.g. in the form of sandwich elements either as such or after they have been laminated with metal, glass, plastics or concrete; if desired, these sandwich elements may be foamed. The products may be used as hollow bodies, e.g. as containers for goods which may be required to be kept moist or cool, as filter materials or exchanges, as catalyst carriers or carriers of active substances, as decorative elements, furniture components and fillings for cavities. They may be used in the field of model building and mold building, and the production of molds for metal casting may also be considered.

The blowing agents may be added to the prepolymer or instead of blowing agents, finely divided inorganic or organic hollow particles, e.g. hollow expanded beads of glass, plastic and straw may be used for producing cellular solid products. These products may be used as insulating materials, cavity fillings, packaging materials, building materials which have good solvent resistance and advantageous fire resistant characteristics. They may also be used as light-weight building bricks in the form of sandwiches, e.g. with metal covering layers for house building and the construction of motor vehicles and aircraft.

Organic or inorganic particles which are capable of foaming up or have already been foamed may be incorporated in the fluid foaming reaction mixture, e.g. expanded clay, expanded glass, wood, cork, popcorn, hollow plastic beads, e.g. beads of vinyl chloride polymers, polyethylene, styrene polymers or foam particles of these polymers or of other polymers, e.g. polysulphone, polyepoxide, polyurethane, urea-formaldehyde, phenol-formaldehyde, polyimide polymers, or, alternatively, heaps of these particles may be permeated with foaming reaction mixture to produce insulating material which have good fire resistant characteristics.

The cellular solid products of this invention, in the aqueous or dry or impregnated state, may be subsequently be lacquered, metallized, coated, laminated, galvanized, vapor treated, bonded or blocked. The cellular solid products may be sawed, drilled, planed, polished or used in other working processes to produce shaped products. The shaped products, with or without fillers, may be further modified in their properties by subsequent heat treatment, oxidation processes, hot pressing, sintering processes or surface melting or other compacting processes.

The novel cellular solid products of the invention are also suitable for use as constructional materials due to their toughness and stiffness, yet they are still elastic. They are resistant to tension and compression, have a high dimensional stability to heat and high flame resistance. They have excellent sound absorption capacity, heat insulating capacity, fire resistance, and heat resistance which makes them useful for insulation. The cellular products of this invention may be foamed on the building site and, in many cases, used in place of wood or hard fiber boards. Any hollow forms may be used for foaming. The brittle foams may be crushed and used for propagation of seedlings, cuttings and plants or cut flowers.

A water binding component such as hydraulic cement, synthetic anhydrides, gypsum or burnt lime may be added to any of the components such as the polyisocyanate silicate prepolymer or curing agent or may be mixed simultaneously with them, to produce a tough, somewhat flexible solid or cellular solid concrete. This mixture may be used as surface coatings having good adhesion and resistance to abrasive properties, as mortars for making molded products, particularly in construction engineering and civil engineering such as for building walls, roadbuilding, igloos, boats, etc. The products are light weight, thermal insulating materials with excellent mechanical properties and fire-resistance. The products have good salt-water-resistant properties, will float and may be used to make light concrete boats. It is preferable that the polyisocyanate or polyisocyanate silicate prepolymer is first reacted with a polyol to produce an isocyanate-terminated polyurethane preopolymer or isocyanate-terminated polyisocyanate silicate containing a polyol; then the prepolymer is reacted with the water-binding component and the curing agent. The polyol is added in the ratio of 1 to 50 mols of the polyol to 50 to 90 mols of the polyisocyanate. Good concrete products can be obtained without using polyurethane prepolymers or polyols. Oxidation silicon acids such as hydrated silica, silica, natural products containing free silicic acid and/or silicon oxide groups and hydrated silica containing Si-H groups may be added to the polyisocyanate silicate prepolymer or curing agent to produce the concrete products. The amount of water binding component used varies greatly depending on the type of product desired, from 0% to 200% by weight, based on the total weight of the components. In certaing cases, it is desirable to add sand and gravel in the amount of 1 to 6 parts by weight to each part by weight of the hydraulic cement in the invention. The mixture may be poured in place, trowelled on or sprayed onto the desired surface to produce a solid or cellular solid product.

Fillers in the form of powders, granules, wire, fibers, dumbbell-shaped particles, crystallites, spirals, rods, beads, hollow beads, foam particles, non-woven webs, pieces of woven webs, pieces of woven or knitted fabrics, tapes and pieces of foil of solid inorganic or organic substances, e.g. dolomite, chalk, alumina, asbestos, basic silicic acids, sand, talc, iron oxide, aluminum oxide and hydroxide, alkali metal silicates, zeolites, mixed silicates, calcium silicate, calcium sulphates, alumino silicates, cements, basalt wool or powder, glass fibers, carbon fibers, graphite, carbon black, Al, Fe, Cu and Ag powders, molybdenum sulphide, steel wool, bronze or copper meshes, silicon powder, expanded clay particles, hollow glass beads, glass powder, lava and pumice particles, wood chips, woodmeal, cork, cotton, straw, popcorn, coke or particles of filled or unfilled, foamed or unfoamed, stretched or unstretched organic polymers, may be added to the mixture of the components in many applications. Among the numerous organic polymers which may be used, e.g. as powders, granules, foam particles, beads, hollow beads, foamable but not yet foamed particles, fibers, tapes, woven fabrics or fleeces, the following may be mentioned as examples: polystyrene, polyethylene, polypropylene, polyacrylonitrile, polybutadiene, polyisoprene, polytetrafluoroethylene, aliphatic and aromatic polyesters, melamine, urea, phenol resins, phenol silicate resins, polyacetal resins, polyepoxides, polyhydantoins, polyureas, polywthers, polyurethane, polyimides, polyamides, polysulphones, polycarbonates and copolymers thereof.

The composite materials of the invention may be mixed with considerable quantities of fillers without losing their advantageous properties and, in particular, composite materials which consist predominantly of organic constituents which are preferably filled with inorganic fillers; where silicate constituents predominate, it is preferably filled with organic fillers. Fillers which are particularly preferred are chalk, talc, dolomite, gypsum, clay, anhydrite, glass, carbon and the conventional plastics and rubber waste.

In the production of surface coating, bonds, putties or interlayers, particularly in the case of porous materials, it is preferred to use polyisocyanates whcih have only a low isocyanate content, e.g. less than 5%, or prepolymers which are free from isocyanate groups. The mixtures obtained in this way have a long pot life and may be applied in thin layers which gradually harden in the course of time. The liberated $CO_2$ acts as the curing agent. A two-stage or multistage hardening in which, for example, when an excess of water is used, there is a rapid evolution of $CO_2$, and the polyisocyanate silicate solid product is converted into a plastic or thermoplastic workable form which may be used as putties, coating agents, grouting materials or mortar. This thermoplastic form may also be injected, molded, extruded or worked-up in a kneader. In certain cases where an excess of alkali earch metal oxide or hydroxide is present to react with the $CO_2$, very little foaming is produced and the product may be used as a putty material.

In many cases, the polyisocyanate silicate solid or cellular solid products produced by this invention are soluble in organic solvents and may be used as tough coating agents for wood and metal. The mixtures of the invention are also suitable for use as impregnating agents for finishing fibers. The mixtures may also be extruded through dies or slots and converted into fibers and foils. These fibers and foils may be used for producing synthetic incombustible paper or fleeces.

The polyisocyanate silicate prepolymer and the curing agent may be mixed, then dropped in the form of small droplets into organic liquids such as petroleum hydrocarbons as they are foaming and hardening, thereby producing foam beads. The soluble polyisocyanate silicate solid or cellular solid product may be used as an adhesive for wood, metals and plastics.

The object of the present invention is to provide a novel process to produce polyisocyanate silicate solid or cellular solid products. Another object is to produce novel polyisocyanate silicate solid or cellular solid products which are relatively low in cost. Still another object is to produce novel fine cellular solid products of relatively low cost, rigid, light-weight, high-strength properties which have good resistance and dimensional stability when heated. Another object is to produce solid or cellular solid products which may be used for thermal insulation, structural purposes, sound proofing, shock-resistant packaging, cushions, coating for wood and metals, adhesive, casting material, putties, concrete, etc. Another object is to produce polyisocyanate silicate products that are soluble in organic solvents and may be used as a protective coating and as an adhesive on wood, metal and plastics.

DESCRIPTION OF PREFERRED EMBODIMENTS

My invention will be illustrated in greater detail by the specific examples which follow, it being understood that these preferred embodiments are illustrative, but not limited to, procedures which may be used in the production of polyisocyanate silicate solid or cellular solid products. Parts and percentages are by weight unless otherwise indicated.

EXAMPLE 1

One mol of silicon tetrachloride is slowly added to 4 mols of ethylene glycol while agitating until the mixture is thoroughly mixed. Hydrogen chloride evolves from the mixture. The reaction is complete in 1 to 4 hours, thereby producing ethylene glycol silicate resinous product, a clear solid which easily breaks up into small particles. Toluene diisocyanate (80% 2,4-isomer and 20% 2,6-isomer) is added to ethylene glycol silicate resinous product while agitating for 10 to 60 minutes, thereby producing a polyisocyanate silicate prepolymer.

About 10% by weight of water, percentage based on the weight of the prepolymer, containing 0.1% triethylamine and 1% soap is mixed with the polyisocyanate silicate prepolymer thoroughly; the mixture expands 3 to 12 times its original volume in a few minutes to produce a rigid polyisocyanate silicate cellular solid product. The prepolymer will also foam if the temperature rises much above 60° C. to produce a rigid polyisocyanate silicate cellular solid product.

The cellular solid product is soluble in organic solvent, such as acetic acid, acetone, etc., and the solution may be used as a tough, clear, light brown coating for wood and as an adhesive for wood, metal and plastics.

EXAMPLE 2

One mol of silicon tetrachloride, 4 mols of propylene glycol and 2.5 mols of toluene diisocyanate are added simultaneously while agitating at ambient temperature and pressure for 10 to 60 minutes, thereby producing a polyisocyanate silicate prepolymer.

20% by weight of water, percentage based on the prepolymer, containing 20% sodium silicate, 1% triethylamine and 1% detergent, are added to the prepolymer and thoroughly mixed. The mixture expands 3 to 6 times its original volume, thereby producing a rigid polyisocyanate silicate cellular solid product.

The product is soluble in organic solvents such as acetic acid, acetone, etc., and the solution may be used as a tough, clear, light brown coating for wood and as an adhesive for wood, metal or plastics.

EXAMPLE 3

One part by weight of castor oil and 2 parts by weight of toluene diisocyanate is reacted to produce an isocyanate-terminated polyurethane prepolymer which is then added to one part by weight of the ethylene glycol silicate resinous product as produced in Example 1, while agitating for 10 to 60 minutes, thereby producing a polyisocyanate silicate prepolymer.

About 10% by weight of granular sodium metasilicate pentahydrate, percentage based on the prepolymer, is added to the prepolymer, then heated to about 60° C. while agitating, and the mixture expands 3 to 12 times its original volume, thereby producing a semi-rigid polyisocyanate silicate cellular solid product.

EXAMPLE 4

About 1 mol of silicon tetrachloride is added to 6 mols of butane-1,4-diol while agitating, thereby producing butylene glycol silicate resinous product. About equal parts by weight of toluene diisocyanate and the butylene glycol silicate resinous products are mixed, then agitated; the temperature rises to above 60° C., and the mixture rapidly expands, thereby producing a rigid, brittle, polyisocyanate silicate cellular product. The cellular solid product is soluble in organic solvents such as acetic acid, acetone and petroleum distillates, etc.; the solution may be used for a tough, clear, light brown, protective coating on wood or metal and may be used as an adhesive on wood, metal or plastics.

EXAMPLE 5

About 1 part by weight of silicon tetrachloride, 3 parts by weight of castor oil and 3 parts by weight of toluene diisocyanate are added simultaneously while agitating for 10 to 60 minutes, thereby producing a soft, rubbery polyisocyanate silicate prepolymer. The prepolymer is heated to 60° to 120° C. for 20 to 120 minutes, and the mixture expands 3 to 6 times its original volume, thereby producing a tough, flexible semi-elastic polyisocyanate silicate cellular solid product.

EXAMPLE 6

About 1 mol of silicon tetrachloride, 4 mols of polyethylene glycol (average mol weight 520) are mixed, then agitated until they are thoroughly mixed. The reaction is complete in 1 to 4 hours; hydrogen chloride evolves from the mixture, thereby producing polyethylene glycol silicate resinous product. About equal parts by weight of the resinous product and toluene diisocyanate are mixed, then agitated for 10 to 60 minutes, thereby producing a polyisocyanate silicate prepolymer.

About equal parts by weight of water containing 60% Portland cement, 10% sodium silicate and 10% silica sol is added to the prepolymer, then mixed thoroughly, thereby producing a tough polyisocyanate silicate concrete product.

EXAMPLE 7

About 1 mol of silicon tetrachloride and 3 mols of polypropylene glycol (average mol weight 500) are mixed, then agitated until they are thoroughly mixed. The reaction is complete in 1 to 4 hours, thereby producing polypropylene glycol silicate resinous product. Toluene diisocyanate is added to the resinous product in an NCO/OH molar ratio of about 2:1, while agitating at ambient temperature and pressure for 10 to 60 minutes, thereby producing a polyisocyanate prepolymer.

About 25% by weight, percentage based on the prepolymer, of an aqueous sodium silicate ($SiO_2:Na_2O$ ratio 3.22:1, 37.6% silicate) is thoroughly mixed with the prepolymer, and the mixture cures to give a tough, rubbery polyisocyanate silicate solid product.

EXAMPLE 8

In the following Example, various curing agents will be used. About 1 mol of silicon tetrachloride and 4 mols of a polyester containing at least 2 hydroxyl groups per mol (average mol weight 800) are mixed, then agitated for 10 to 60 minutes, and the reaction is complete in 1 to 4 hours, thereby producing a polyol silicate resinous product. Toluene diisocyanate is added to the polyol silicate resinous product while agitating for 10 to 60 minutes, and in an amount sufficient to produce an isocyanate-terminated polyisocyanate silicate prepolymer with an NCO content of 21%.

One of the curing agents listed below is added to the said prepolymer and mixed thoroughly; the mixture expands 3 to 12 times its original volume to produce a polyisocyanate silicate cellular solid product.

Curing agents:
(a) 10% by weight of water, percentage based on prepolymer in all the examples of curing agents.
(b) 20% by weight of water containing 20% sodium silicate (molecular weight ratio $Na_2O \cdot SiO_2 = 1:2$) and 0.01% triethylamine.
(c) 15% by weight of fine granular sodium metasilicate pentahydrate and the mixture is heated to about 60° C.
(d) 20% by weight of water containing 40% potassium silicate, 5% alumina, 0.01% N-ethyl-morpholine, 1% soap and 1% foam stabilizer.

(e) 15% by weight of water containing 20% silica sol and 5% magnesium oxide.
(f) 25% by weight of water containing 50% gypsum and 0.1% triethylamine.
(g) 25% by weight of water containing 50% burnt lime and 0.01% triethylamine.
(h) 200% by weight of an aqueous solution containing 60% quick-setting cement and 0.01% triethylenediamine, 0.01% stannous octoate and 0.5% detergent.
(i) 10% by weight of an aqueous solution containing 2% sodium phenolate and 20% glycerol.
(j) 20% by weight of an aqueous solution containing 10% sodium polysulfide, 0.5% soap, 0.01% tin ethyl hexoate and 0.05% N,N-diethylbenzylamine.

EXAMPLE 9

In the following Example, various polyisocyanates will be used. One mol of silicon tetrachloride is added to 3 mols of triethylene glycol while agitating for 10 to 60 minutes, and the reaction is complete in 1 to 4 hours, thereby producing a polyol silicate resinous product. A sufficient amount of one of the polyisocyanates listed below is added to the triethylene glycol silicate resinous product while agitating for 10 to 60 minutes, thereby producing an isocyanate-terminated polyisocyanate silicate prepolymer with an NCO content of about 18%.

About 5% by weight of water containing 0.01% pentamethyldiethylenetriamine and 0.01% dibutyl tin dilaurate are mixed thoroughly with the prepolymer, and the mixture expands 3 to 12 times its original volume, thereby producing a polyisocyanate cellular solid product.

The polyisocyanates used were:
(a) Toluene diisocyanate
(b) ("crude MDI")
(c) Diphenyl-methane diisocyanate
(d) 20% solution of tolylene diisocyanate residue in sulphonated polyphenyl polymethylenepolyisocyanate with NCO of about 32%.
(e) Sulphonated toluene diisocyanate with about 1% by weight of sulphur.

EXAMPLE 10

About 1 part by weight of a dry, fine, granular hydrated silica is mixed with about 1 part by weight of silicon tetrachloride, then agitated for 1 to 4 hours, and the chemical reaction is complete in 6 to 12 hours; hydrogen chloride evolves the mixture, thereby producing a white granular mixture of halosilicon acids.

One part by weight of the halosilicon acids is mixed with 4 parts by weight of ethylene glycol, then agitated at ambient temperature and pressure for 1 to 2 hours; the reaction is completed in 2 to 8 hours, thereby producing a clear, solid polyol silicon acid resinous product which readily breaks up into small granules.

The ethylene glycol silicon acid resinous product is mixed with toluene diisocyanate, then agitated for 10 to 60 minutes in amount to produce an isocyanate-terminated polyisocyanate prepolymer with an NCO content of about 15% by weight.

About 10% by weight of an aqueous solution containing 10% potassium silicate and 0.01% triethylamine, percentage based on the weight of the prepolymer, is thoroughly mixed with the prepolymer, and the mixture expands 6 to 10 times its original volume, thereby producing a rigid polyisocyanate silicate cellular solid product.

Other polyols which are listed in the Specification may be used in the amount to produce a polyol silicon acid resinous product which contains free hydroxyl and/or silicic acid groups. These polyol silicon acid resinous products may then be reacted with a polyisocyanate and/or an isocyanate-terminated polyurethane prepolymer to produce a polyisocyanate silicate solid or cellular solid product when reacted with a curing agent.

EXAMPLE 11

About 1 part by weight of fine granular hydrated silica with Si-H groups is mixed with 2 parts by weight of silicon tetrachloride, then agitated at ambient temperature for 1 to 4 hours, and the chemical reaction is complete in 6 to 12 hours, thereby producing a white, fine, granular mixture of halosilicon acids.

About 1 part by weight of the halosilicon acid is mixed with 3 parts by weight of polyethylene glycol (average molecular weight of 520), then agitated for 1 to 2 hours; the reaction is complete in 2 to 8 hours, thereby producing a polyol silicon acid resinous product, a clear, solid product which readily breaks up with agitation into fine white granules.

About equal parts by weight of toluene diisocyanate and the polyol silicon resinous granules are mixed, then agitated at ambient temperature for 10 to 60 minutes, thereby producing an isocyanate-terminated polyisocyanate silicate prepolymer.

About equal parts by weight of the prepolymer and an aqueous solution containing 60% by weight Portland cement, 10% by weight of sodium silicate, and 0.01% triethylamine are mixed thoroughly. The mixture sets in a few minutes to a solid concrete product.

EXAMPLE 12

About 1 part by weight of the halosilicon acids as produced in Example 10 and 3 parts by weight of castor oil are mixed at ambient temperature and pressure, then agitated for 1 to 4 hours; the reaction is complete in 2 to 8 hours, thereby producing a castor oil silicon acid resinous product.

About equal parts by weight of the castor oil silicon acid resinous product and toluene diisocyanate are mixed then agitated for 10 to 60 minutes, thereby producing an isocyanate-terminated polyisocyanate silicate prepolymer.

About 20% by weight of an aqueous solution, percentage based on the weight of the prepolymer, containing 10% sodium silicate, 5% magnesium oxide, 1% soap and 0.01% triethanolamine is added to the prepolymer and thoroughly mixed; the mixture expands 6 to 12 times its original volume, thereby producing a tough, rigid polyisocyanate silicate cellular solid product.

EXAMPLE 13

A liquid isocyanate-terminated polyurethane prepolymer having an NCO content of about 20% by weight and produced by reacting toluene diisocyanate with castor oil is mixed with the castor oil silicon acid resinous product as produced in Example 11, then agitated for 10 to 60 minutes, and in the amount to produce an isocyanate-terminated polyisocyanate silicate prepolymer which has an NCO content of about 7%.

About 50% by weight of a curing agent, percentage based on weight of the prepolymer, (curing agent is an aqueous solution containing 30% sodium silicate and 0.01% triethylamine) is thoroughly mixed with the prepolymer, thereby producing a soft putty polyisocyanate silicate solid product which slowly hardens to a tough solid.

EXAMPLE 14

In the following Examples, various polyisocyanates will be used. About 1 part by weight of the halosilicon acids as produced in Example 11 and 3 parts by weight of polypropylene (average molecular weight of 500) are mixed, then agitated for 1 to 2 hours; the reaction is complete in 2 to 8 hours, thereby producing a polyol silicon acid resinous product.

A polyisocyanate, as listed below, is then mixed with the polyol silicon acid resinous product, then agitated for 10 to 60 minutes, and in the amount to produce a polyisocyanate silicate prepolymer with an NCO content of about 15% by weight.

About 20% by weight, percentage based on weight of the prepolymer, of an aqueous solution of sodium, water glass (44%, $Na_2O \cdot SiO_2 = 1:2$) and 0.01% triethylamine is thoroughly mixed with the polyisocyanate silicate prepolymer; the mixture expands 3 to 12 times its original volume, thereby producing a rigid polyisocyanate silicate cellular solid product.

The polyisocyanates used were:
(a) Methylenedi-p-phenylene diisocyanate
(b) Toluene diisocyanate
(c) ("crude MDI")
(d) 20% solution of tolylene diisocyanate residue in sulphonated polyphenyl polymethylenepolyisocyanate with NCO of about 32%
(e) Sulphonated toluene diisocyanate with about 1% by weight of sulphur

EXAMPLE 15

About 1 part by weight of the halosilicon acids as produced in Example 10 and 2 parts by weight of a polyester resin (produced by reacting 1 mol of phthalic anhydride, 0.5 mol of glycerol and 1 mol of ethylene glycol and containing more than 2 hydroxyl groups per molecule) are mixed, then agitated for 1 to 2 hours; the reaction is complete in 2 to 8 hours, thereby producing a polyol silicon acid resinous product.

Toluene diisocyanate is mixed with the polyol silicon acid resinous product, then agitated for 10 to 60 minutes and in the amount to produce a polyisocyanate silicate prepolymer with an NCO/OH ratio of 2:1.

Various curing agents listed below are mixed with the prepolymer to produce a polyisocyanate silicate solid/cellular solid product. The percentage of the curing agent is based on the weight of the prepolymer:
(a) 90% water containing 50% gypsum and 0.01% triethylamine.
(b) 100% water containing 70% burnt lime and 0.01% triethylenediamine.
(c) 100% water containing 60% cement, 20% silica sol and 0.01% N,N,N',N'-tetramethylenediamine.
(d) 5% water.
(e) 15% aqueous solution of sodium silicate (20% sodium silicate).
(f) 15% water containing 20% magnesium oxide and 0.05% triethylamine.
(g) 10% sodium metasilicate pentahydrate and the mixture is heated to about 60° C.
(h) 15% by weight of an aqueous solution containing 10% sodium phenolate and 20% diethylene glycol.
(i) 10% by weight of an aqueous solution containing 20% sodium polysulfide, 0.5% detergent, 0.01% tin ethyl hexoate and 0.05% N,N-diethylbenzylamine.

EXAMPLE 16

A solution of ethyl magnesium bromide in ether was formed by mixing 3 parts by weight of magnesium, 50 parts by weight of ethyl ether and 15 parts by weight of ethyl bromide. This solution is slowly added over a period of 10 to 30 minutes to about 15 parts by weight of halosilicon acids as produced in Example 10 while agitating at ambient temperature and pressure. The mixture is then heated to the boiling point of the mixture while agitating for about 1 hour. Triethylene glycol is mixed with the ethyl halosilicon acid in the ratio of OH/Cl is 2:1, while agitating for 1 to 2 hours; the reaction is complete in 2 to 8 hours, thereby producing an ethyl triethylene glycol silicon acid resinous product, $MgCl_2$ and magnesium bromide. The mixture is then washed with water, filtered and dried to remove the magnesium salt from the white granules.

The ethyl triethylene glycol silicon acid is mixed with toluene diisocyanate in the OH/NCO ratio of 1:2, while agitating for 10 to 60 minutes, thereby producing a polyisocyanate silicate prepolymer.

About 10% by weight of water containing 0.01% by weight of triethylamine, percentage based on weight of the prepolymer, is added to the prepolymer and thoroughly mixed; the mixture expands 3 to 12 times its original volume, thereby producing a rigid polyisocyanate silicate cellular solid product.

Other organometallic compounds such as lithium organic compounds, sodium organic compounds, dimethyl zinc, diethyl zinc, alkyl magnesium halides, aryl magnesium halides, aryl magnesium halides and mixtures thereof may be used in place of the ethyl magnesium bromide.

EXAMPLE 17

About 3 parts by weight of halosilicon acids as produced in Example 11, about 0.5 part by weight of methyl iodide and about 1 part by weight of amyl bromide are mixed and then added over a period of 10 to 30 minutes to metallic magnesium in ethyl ether, in the proportion of 3 mols of the halide atoms present to one mol of the magnesium in the mixture. The mixture is then heated to the boiling temperature of the mixture while agitating for about 1 hour. Dipropylene glycol is added to the mixture in the ratio of OH/halide is 2:1, then agitated for 1 to 2 hours; the reaction is complete in 2 to 8 hours, thereby producing an organic polyol silicon acid resinous product.

The organic polyol silicon acid resinous product is mixed with toluene diisocyanate in the OH/NCO ratio of 1:1.5, while agitating for 10 to 60 minutes, thereby producing a polyisocyanate silicate prepolymer.

About 15% by weight, percentage based on the weight of the prepolymer, of an aqueous solution containing 20% by weight of sodium silicate, 10% by weight of magnesium oxide, 0.1% by weight of detergent and 0.1% by weight of triethylamine, is thoroughly mixed with the prepolymer; the mixture expands 3 to 12 times its original volume, thereby producing a polyisocyanate silicate cellular solid product.

Other organic halide compounds which are listed in the Specification may be used in place of methyl iodide and amyl bromide.

EXAMPLE 18

A mixture of methyltrichlorosilane and dimethyldichlorosilane are mixed with polyethylene glycol (average molecular weight of 500) in the OH/Cl ratio of 2:1.5, then agitated for 1 to 2 hours; the reaction is complete in 2 to 8 hours, thereby producing a methyl-polyol silane with free hydroxyl groups.

Toluene diisocyanate is mixed with the methyl-polyl silane in the OH/NCO ratio of 1:1.5, then agitated for 10 to 60 minutes, thereby producing a polyisocyanate silicate prepolymer.

About 40% by weight, percentage based on weight of the prepolymer, of an aqueous solution containing 30% sodium silicate and 0.1% triethylamine is thoroughly mixed with the polyisocyanate silicate prepolymer, thereby producing a solid polyisocyanate silicate product.

Other silanes containing dihalides and trihalides may be used in place of methyltrichlorosilane and dimethyldichlorosilane.

EXAMPLE 19

About 1 part by weight of the polyisocyanate silicate prepolymer as produced in Example 12 and 1 part by weight of Portland Cement are mixed; then a curing agent, containing 1 part by weight of water, 1 part by weight of Portland cement, 0.5 part by weight of sodium silicate and 0.01% by weight of triethylamine, is added and thoroughly mixed, thereby producing within a few minutes a tough, solid, rigid concrete.

EXAMPLE 20

Toluene diisocyanate and polypropylene glycol (average molecular weight of 1000) are reacted in the ratio of OH/NCO is 1:2; then sulfur trioxide is reacted with the isocyanate-terminated polyurethane prepolymer until it contains about 1% sulfur. One part by weight of the prepolymer is mixed with 1 part by weight of Portland cement, then 3 parts by weight of a curing agent containing 1 part by weight of Portland cement, 1 part by weight of water, 1 part by weight of sodium silicate and 0.01% by weight of triethylamine, are thoroughly mixed, and in a short period of time it solidifies to produce a tough, rigid, solid concrete.

Although specific materials and conditions were set forth in the above examples, these were merely illustrative of preferred embodiments of my invention. Various other compositions, such as the typical materials listed above, may be used where suitable. The reactive mixtures and products of my invention may have other agents added thereto to enhance or otherwise modify the reaction and products.

Other modifications of my invention will occur to those skilled in the art upon reading my disclosure. These are intended to be included within the scope of my invention, as defined in the appended Claims.

I claim:

1. The process for the production of a polyisocyanate silicate resinous product by the following steps:
   (a) adding a silicon halide to a polyol while agitating at ambient temperature and pressure, thereby producing a polyol silicate resinous product;
   (b) adding a polyisocyanate to said polyol silicate resinous product while agitating for 10 to 60 minutes and in the amount sufficient to produce an isocyanate-terminated polyisocyanate silicate prepolymer, thereby
   (c) producing an isocyanate-terminated polyisocyanate silicate prepolymer,
   (d) adding a curing agent to the isocyanate-terminated polyisocyanate silicate prepolymer and mixing thoroughly, thereby
   (e) producing a polyisocyanate silicate resinous product.

2. The process of claim 1 wherein the silicon halide is silicon tetrachloride.

3. The process of claim 1 wherein the polyol is selected from the group of polyhydric alcohols, polyester polymers with at least 2 hydroxyl groups per mol, polyethers with at least 2 hydroxyl groups per mol, castor oil, polybutadiene polymer and copolymers with free hydroxyl groups, polyacetal polymers with at least 2 hydroxyl groups per mol, polycarbonates with at least 2 hydroxyl groups per mol and mixtures thereof.

4. The process of claim 1 wherein the polyisocyanate is selected from the group consisting of arylene polyisocyanates, and alkylene polyisocyanates.

5. The process of claim 1 wherein the polyisocyanate is toluene 1,4-diisocyanate, toluene 1,6-diisocyanate and mixtures thereof.

6. The process of claim 1 wherein the curing agent is selected from the group consisting of water, water containing 10% to 70% by weight of an alkali metal silicate, water containing 20% to 70% by weight of silica sol, water containing 5% to 40% by weight of magnesium oxide in the form of a colloidal dispersion, alkali metal metasilicate pentahydrate selected from the group consisting of sodium metasilicate pentahydrate, potassium metasilicate pentahydrate, lithium metasilicate pentahydrate, dry granular commercial sodium and potassium silicate, water containing 0.001 to 10% by weight of an activator, selected from the group consisting of a tertiary amine and a tin salt of carboxylic acid, and mixtures thereof.

7. The process of claim 1 wherein the curing agent is added in the amount of 3% to 200% by weight, based on the weight of the polyisocyanate silicate prepolymer.

8. The process of claim 1, wherein the reaction is accompanied by foaming.

9. The process of claim 1, wherein the mixture contains from 0 to 20% by weight, based on the reaction mixture, of a foam stabilizer.

10. The process of claim 1 wherein from 0% to 50% by weight, based on the reaction mixture, of a chemically inert blowing agent, boiling within the range of from −25° C. to 80° C., is added to the isocyanate-terminated polyisocyanate silicate prepolymer in step (d) of claim 1 before adding the curing agent.

11. The process of claim 1 wherein the mixture contains from 0 to 20% by weight, based on the reaction mixture, of an emulsifying agent.

12. The process of claim 1 wherein inorganic or organic particulate or pulverulent fillers are added to the reaction mixture.

13. The process of claim 1 wherein 0 to 95% by weight, based on the weight of the reacton mixture, of a water-binding component is added and wherein the water-binding component is a hydraulic cement, synthetic anhydrite, gypsum or burnt lime.

14. The process of claim 1 wherein about 0% to 50% by weight, based on the weight of the isocyanate-terminated polyisocyanate silicate prepolymer, of a resin extender selected from the mineral oil, coal tar and poly-alpha-methyl-styrene is added to the isocyanate-terminated polyisocyanate silicate prepolymer in step (d) of claim 1 before the curing agent is added.

15. The process of claim 1 wherein from 0% to 50%, based on the weight of the polyisocyanate silicate prepolymer, of a high-boiling aromatic ester plasticizer, selected from the group consisting of benzoate ester, a phthalate ester and a polyester benzoate is added to the polyisocyanate silicate prepolymer in step (d) of claim 1 before the curing agent is added.

16. The process of claim 1 wherein an additional step is taken wherein about 1 part by weight of a dry, fine, granular hydrated silica is added in step (a) of claim 1, and mixed with 1 to 2 parts by weight of the silicon halide, then agitated at ambient temperature and pressure for 1 to 4 hours, and the reaction is complete in 6 to 12 hours, thereby producing a white, fine granular mixture of halosilicon acids.

17. The product produced by the process of claim 1.

18. The product produced by the process of claim 13.

19. The process of claim 1 wherein the silicon halide is added in the ratio of 1 mol to 1 to 4 mols of the polyol.

20. The product produced by the process of claim 16.

* * * * *